United States Patent Office 3,425,530
Patented Feb. 4, 1969

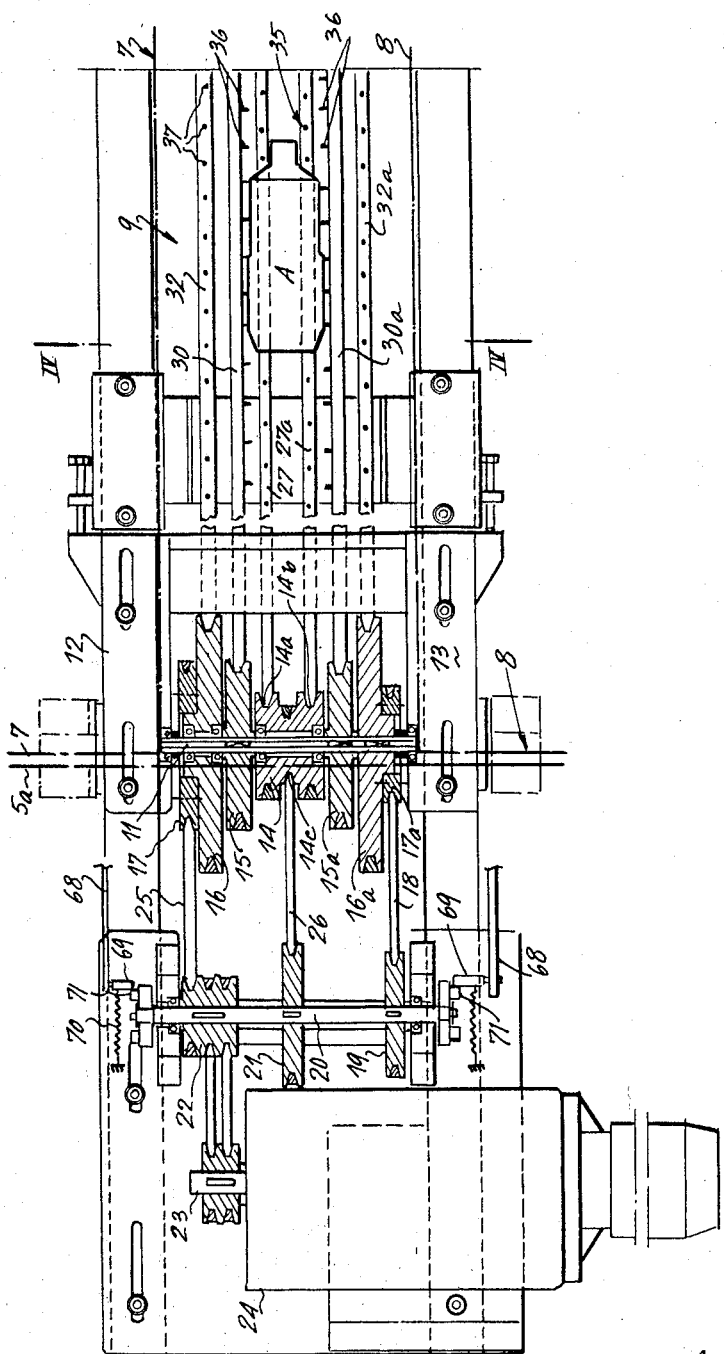

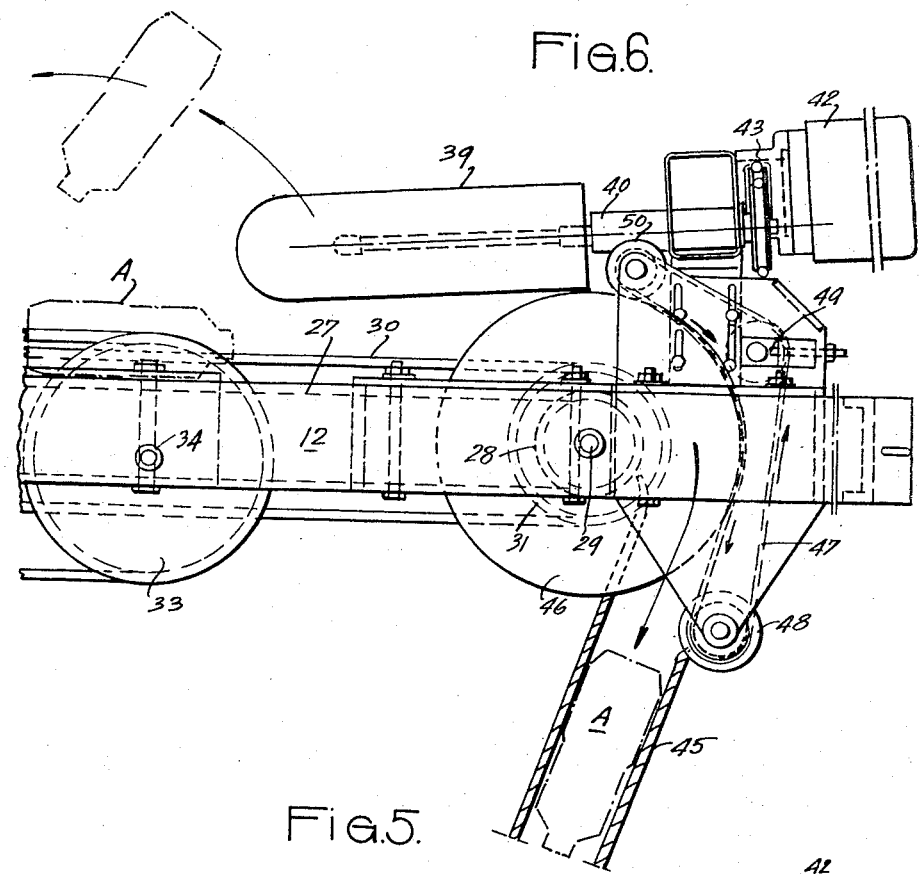

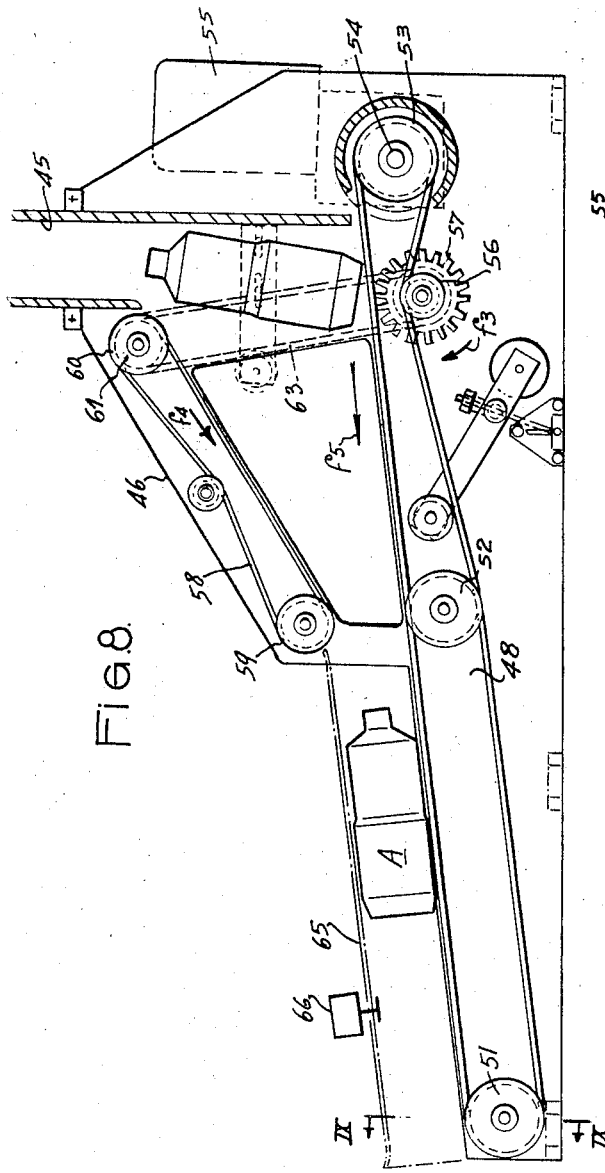

3,425,530
MACHINE FOR STOWING BOTTLES OR FLASKS IN AN ORDERLY POSITION FROM A BATCH OF BOTTLES OR FLASKS IN BULK
Roland Charles Elie Carter, Saint-Cloud, France, assignor to Societe d'Exploitation et de Recherches de Machines et Appareils Specialises ERMAP, Levallois-Perret, Hauts-de-Seine, France, a French company
Filed Apr. 7, 1967, Ser. No. 629,320
Claims priority, application France, Apr. 12, 1966, 57,290
U.S. Cl. 198—33    14 Claims
Int. Cl. B65g 47/24

ABSTRACT OF THE DISCLOSURE

Machine for stowing bottles in an orderly position, comprising a receiving chamber for the bottles, a set of endless conveyors departing from the lower part of said chamber, two sloping deflectors contiguous with the set of endless conveyors, said endless conveyor comprising two side belts driven at different speeds and extending according to a rising plane, an assembly of rotating brushes projecting above the conveyor at its upper end for extracting the bottles not properly aligned, an accelerating device for the bottles at the end of said endless conveyor, a receiving chute for the bottles so led by the accelerating device, a selective turning device provided at the end of the chute extending approximately vertically and an evacuating conveyor for the bottles all then aligned in the same direction.

---

Especially in household and foodstuff products industries, there is more and more a tendency to use receptacles made of plastic having the appearance of bottles or flasks. These bottles are generally made by specialized manufacturers and delivered in bulk to users who have their own system for filling said bottles.

It has been proved, owing to the large quantities of bottles and flasks used, that the stowing of said bottles and flasks and their loading on to the filling machines formed a difficult problem to solve, for if this work is done by hand it requires a large staff, and also, it has appeared to be extremely difficult mechanically to ensure an efficacious arranging of bottles and flasks owing to their relative fragility, and on account of the necessity of being able to deal with a very large number of bottles, which may amount to several thousands per hour.

The present invention completely solves this problem by creating a new entirely self-contained machine which gives the certainty that the bottles are always properly arranged, whatever the position in which they are conveyed to the machine. Actually, the machine of the invention can be supplied directly from a hopper or other receptacle, in which the bottles are in bulk. Moreover, the output of the machine of the invention can be regulated to a wide extent, thus enabling it to be adapted, without mechanical alteration, to existing filling systems.

According to the invention, the machine comprises a receiving chamber for bottles in bulk, said chamber having a sloping bottom whose lowest edge is contiguous to the bottom edge of two deflectors rising and sloping crosswise so as appreciably to form a V, said two deflectors being separated from each other by a set of endless conveyors forming an alignment device for the bottle or flasks delivered in bulk from the receiving chamber, said conveyors forming an alignment device transferring the bottles into a chute leading them to a selective turning unit acting so that all the bottles are brought to the same position on a conveyor belt taking them to an ejecting spout from where they are conveyed to a utilization point.

Numerous other characteristics of the invention will moreover be revealed by the detailed description which follows.

One method of carrying out the object of the invention is shown, by way of non-restrictive example, in the accompanying drawing.

FIG. 3 is a section, partly in elevation, on a larger scale, taken along the line III—III of FIG. 1.

FIG. 5 is a partial plan view on a larger scale seen along the line V—V of FIG. 1.

FIG. 6 is a side elevation corresponding to FIG. 5.

FIG. 7 is a plan view at a larger scale seen along the line VII—VII of FIG. 1.

FIG. 8 is a side elevation, partly in section, corresponding to FIG. 7.

FIG. 9 is a section taken along the line IX—IX of FIG. 8.

Figure 1:
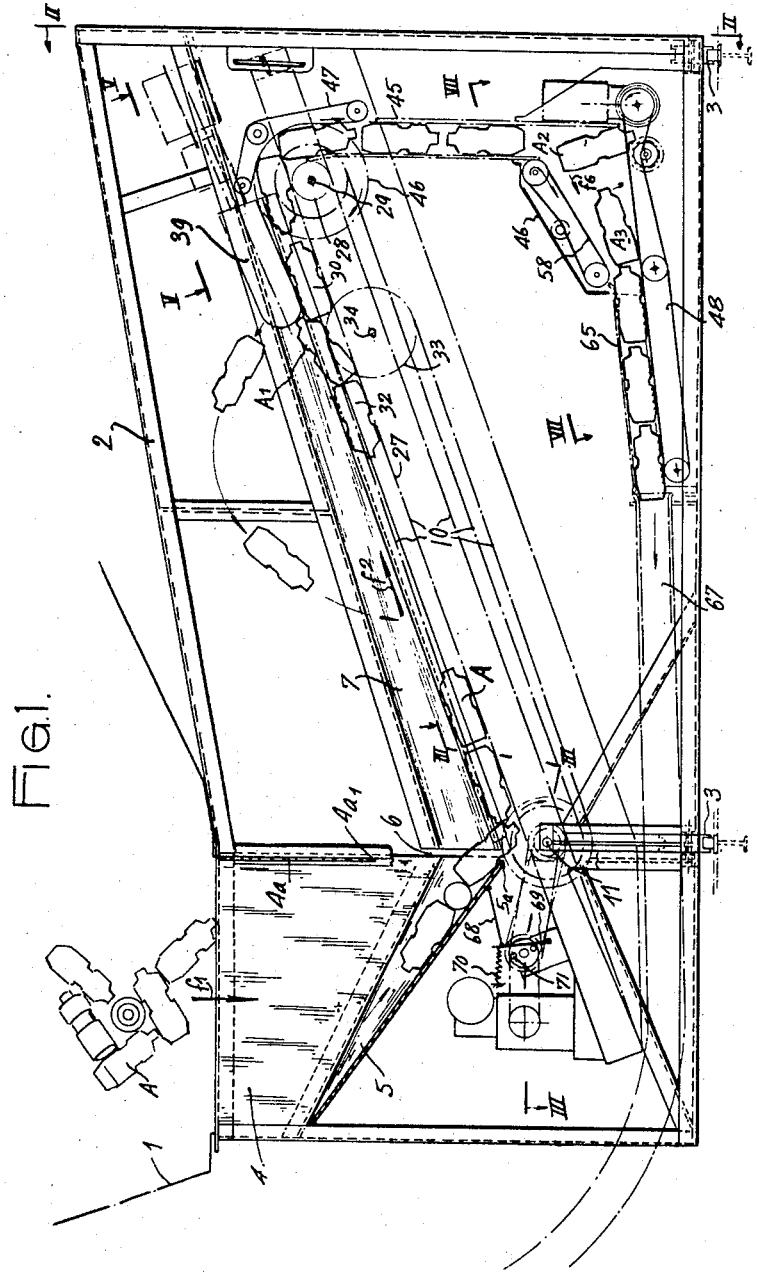
FIG. 1 is a diagrammatical longitudinal elevation, partly in section, of the stowing machine of the invention.

The machine shown in the drawing is made in the shape of a self-contained unit intended to be put into connection with a hopper for storing bottles or flasks, this hopper being diagrammatically shown in FIG. 1, where it is designated by the reference numeral 1.

To form a self-contained unit, the machine comprises a frame, designated on the whole by 2, which is made of metal sections held together to form a support for the assembly of members which are described farther on.

The frame itself may be made in various ways and is not described in detail, the essential point according to the invention being that this frame forms a rigid assembly. If so desired, the frame can be mounted on rollers 3, so as to be moved along suitable runways.

The part of the machine that is directly connected to the hopper 1 delimits a receiving chamber 4 for the bottles or flasks A contained in the hopper. This receiving chamber has an appreciably rectangular cross-section and its bottom 5 is sloped and practically assumes a semi-dihedron shape whose concavity would be directed upwards and whose largest section is situated at the lowest level. This shape of the bottom of the chamber 4 means that a progressively increasing space is given to the bottles A which travel in the direction of the arrow $f_1$, and then all risk is eliminated of the bottles cramming or forming an arch inside the chamber 4.

All other shapes enabling the same result could moreover be given to the chamber 4, without going outside of the scope of the invention.

Actually, it has generally been found essential that the chamber 4 should be made so as to prevent the bottles from forming arches, and also, a dynamic mechanism is described farther on that is also advantageously added, although it may not be necessary in all cases for preventing the forming of arches by the bottles.

The walls delimiting the receiving chamber 4 can be of sheet metal or plastics and the wall designated by 4a which extends vertically, or appreciably vertically, over the lowest side of the bottom 5 is open for all or part of width to delimit a large sized opening 6, between its lower edge $4a_1$ and the corresponding part 5a of the bottom 5.

The wall 4a is advantageously made of relatively flexible material, or at least, its part forming its edge $4a_1$, so as not to risk damaging the bottles.

Figure 2:
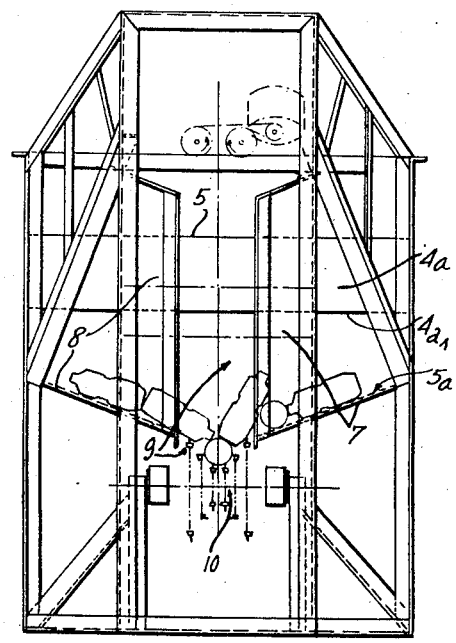
FIG. 2 is a diagrammatic elevation view along the line II—II of FIG. 1.

The extreme edge 5a of the bottom is aligned with the corresponding edge of two rising deflectors 7 and 8 which are sloped as shown in FIGS. 1 and 2, both in the transversal and longitudinal planes of the machine. The deflectors 7 and 8 delimit a passage 9 between them, extending for their entire length.

The passage 9 is occupied for its entire length by a device, called alignment device, designated generally by 10 in FIGS. 1 and 2. This alignment device is formed by a set of endless belts whose arrangement is clearly shown in FIGS. 3 to 6.

Looking at FIGS. 1 and 3, we notice that a shaft 11 is placed transversely to the longitudinal axis of the machine, below the junction line existing between the bottom 5 of the chamber 4 and the front end of the double-slope deflectors 7 and 8. The shaft 11 is held between two frame-members 12 and 13 thus forming supports for the deflectors 7 and 8 and is provided in the middle with a pulley 14 with two grooves 14a, 14b, of the same diameter, separated by a smaller diameter groove 14c. The pulley 14 is loosely mounted on the shaft 11 and surrounded by two pulleys 15 and 15a identical to each other, but of larger diameter than the pulley 14.

In the example shown, the pulleys 15 and 15a are keyed on to the shaft 11 so as to be driven by the latter.

The pulleys 15 and 15a are themselves surrounded by two pulleys 16 and 16a having the same diameter between them, but whose diameter is still greater than that of the pulleys 15 and 15a.

In the example shown, the pulley 16 is mounted loosely on the shaft 11, but made integral with a driving pulley 17, whereas the pulley 16a is keyed on to the shaft 11, and is moreover integral with a driving pulley 17a. For rotatively driving the shaft 11, the pulley 17a is connected by a belt 18 to a motive pulley 19 keyed on to a shaft 20, also supporting, keyed onto it, on the one hand, a pulley 21, and on the other, a pulley 22. The pulley 22 forms the driving pulley for the shaft 20 and is connected for this purpose to the output shaft 23 of an electric motor 24, eventually incorporating reducing gear. The pulley 22 also acts, by the belt 25, for driving the pulley 17 which is integral with the pulley 16, loosely mounted on the shaft 11.

As shown by the drawing, the pulleys 19 and 22 are of different diameters, like the pulleys 17a and 17, to which they are connected by the belts 18 and 25. It follows— and this can be clearly seen in FIG. 3— that the pulleys 17 and 17a are driven at different rotation speeds, and hence their peripheric speed is different, because said two pulleys 16 and 16a have the same diameter.

The pulley 14 with the two grooves 14a and 14b of the same diameter, is driven by the pulley 21 by means of a belt 26, and consequently its speed is independent from that of the shaft 11, seeing that said pulley 14 is loosely mounted on the latter. The two pulleys 15 and 15a which are keyed onto the shaft 11, and hence always driven at the same angular speed as the latter, but the diameter of the pulleys 17a and 19 driving the shaft 11 has been fixed, so that the linear speed of the periphery of the pulleys 15 and 15a which are of larger diameter than the pulley 14, is at all times the same as the linear speed of the periphery of this latter pulley.

The pulley 14 is connected by two belts 27, 27a to two loose pulleys 28, 28a (FIGS. 1, 5 and 6) mounted on a spindle 29 placed transversely near the end of the frame-members 12, 13 i.e., at the upper end of the deflectors 7, 8. The loose pulleys 28, 28a are of the same diameter as the pulley 14, so that the belts 27, 27a form an endless conveyor element.

The distance apart of the grooves 14a, 14b of the pulley 14, and hence, the distance apart of the belts 27, 27a, is chosen smaller than the diameter of the bottles or flasks A, so that the latter do not risk passing between said belts 27, 27a, no matter what position they occupy when they are brought into contact with said belts 27, 27a.

In like manner, the pulleys 15 and 15a are connected by belts 30, 30a, to loose pulleys 31, 31a also carried by the spindle 29 and placed on either side of the pulleys 28, 28a. The belts 30, 30a form a second conveyor extending parallel to the conveyor formed by the belts 27, 27a but offset in level in relation to this latter conveyor, because the pulleys 15, 14a, as well as the pulleys 31, 31a are of larger diameter than the pulley 14 and the pulleys 28, 28a.

Figure 4:
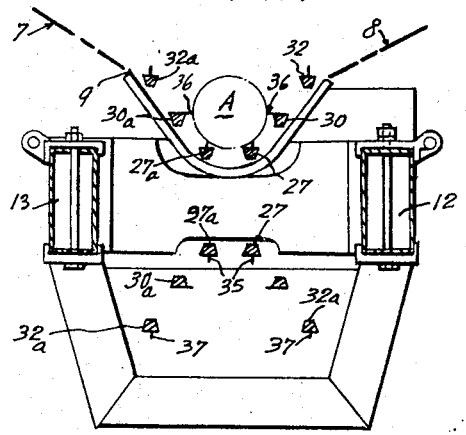
FIG. 4 is a cross section taken along the line IV—IV of FIG. 3.

The distance apart of the belts 30, 30a is slightly greater than the diameter of the bottles or flasks A, so that the latter are obliged to pass between said belts 30, 30a for coming into contact with the belts 27, 27a, as shown in FIG. 4.

The pulleys 16 and 16a are connected by belts 32, 32a to pulleys 33, 33a, carried by a shaft 34 mounted between the frame-members 12 and 13, upstream from the shaft 29, if we consider the travelling direction of the various belts which is that shown by the arrow $f_2$ in FIG. 1.

The pulleys 33, 33a have the same diameter as the pulleys 16, 16a, and hence, the belts 32, 32a form a third conveyor, parallel to those made by the belts 27, 27a, on the one hand, and by the belts 30, 30a on the other. The distance apart of the belts 32, 32a is obviously greater than the diameter of the bottles or flasks, but is preferably chosen to be less than the length of the latter.

As shown by the drawing, one of the particularities of the invention consists of providing the belts 27, 27a with flexible barbs 35, made of rubber, for instance, which project vertically in relation to the plane of each belt. These barbs are regularly spaced apart and are intended to increase adhesion between belts and flasks, without, however, risking the damaging of the latter.

In like manner, the belts 30, 30a are provided with barbs 36, but these extending laterally in relation to said belts for being directed one towards the other, as shown, in particular in FIG. 4, the function and kinds of these barbs are similar to those described with reference to the barbs 35.

The belts 32, 32a are also provided with barbs designated by 37 and these latter barbs project vertically in the same way as the barbs 35.

As explained in the foregoing, the pulleys 16 and 16a are driven at different peripheric linear speeds, and consequently, the speed of the belts 32 and 32a is also different. It follows that in the event of a bottle extending crosswise on the belts 32, 32a, this will necessarily result that said bottle, while it would be moved in the direction of the arrow $f_2$ (FIG. 1) would be subjected to a pivoting movement, so that it would be brought to a coaxial position with the other belts and thus fall between the belts 30, 30a, coming to rest on the belts 27, 27a, while being laterally held by the barbs 36 of said belts 30, 30a. In this manner, one is assured that all the bottles are necessarily brought into an aligned position one behind the other, when the bottles arrive in the vicinity of the pulleys 28, 28a and 31, 31a, supporting the belts.

The drawing, and more particularly FIGS. 1, 5 and 6 show that there is placed between the shafts 29 and 34, above the belts 30, 30a and appreciably in alignment with the belts 32, 32a, two brushes 38, 39 extending axially in the same direction as the belts 30, 30a and 27, 27a. The brushes 38, 39 are supported and driven by shafts 40, 41, which themselves are driven from a motor 42 by a belt 43 and a set of pulleys 44, so that said two brushes 38, 39, revolve in opposite directions.

In looking at FIG. 1, we see that the bottles A if they are aligned when they rest on the belts 27, 27a, can sometimes mutually overlap, as in the case of the bottle A₁. In this case, the bottle A₁ which comes into contact with the brushes 38, 39, is caught by the latter and ejected, so as to be thrown towards the bottom of the conveyors. Owing to the existence of the deflectors 7, 8 which are sloping, the bottles thus ejected are brought by gravity towards the various conveyor belts, and then, recovered until the moment when their position is suitable.

At the end of the device 10, called the alignment, formed by the conveyor belts described above, a tubular chute 45 is provided, extending appreciably vertically and into which the bottles are successively introduced.

Experience has shown that the pivoting movement undergone by the bottles for introducing them into the chute 45 had the effect of tending to slow them down, and consequently, there was a risk that the bottles would be badly inserted in the chute or damaged before being introduced into said chute.

To obviate this disadvantage, according to one characteristic of the invention, the speed of the bottles is accelerated during their pivoting movement from the belts 27, 27a up to their being inserted in the chute 45. The drawing and more particularly FIGS. 1 and 6 show how this result is obtained.

Discs 46, 46a are rigidly connected to the pulleys 31, 31a on which the belts 30, 30a are stretched, these discs being a larger diameter than said pulleys 31, 31a, the diameter of said discs being fixed so that their peripheric edge corresponds with the trajectory that must be followed by the wall of the bottles farthest removed from that in contact with the belts 27, 27a. On part of the periphery of the discs 46, 46a, a strip 47 is carried which is wound on drums 48, 49 and 50 of which at least one is movable for ensuring a suitable tension to said strip 47. The strip 47 is consequently driven by the peripheric edge of the discs 46, 46a and its linear speed is hence greater than that of the belts 27, 27a and 30, 30a, so that the bottles which are brought into contact with the strip 47 have their speed suddenly accelerated, which greatly facilitates their extraction from the belts 27, 27a and their introduction into the chute 45 whose strip 47 forms a part of the entry wall.

As shown by the preceding description, the bottles are necessarily aligned when they are in the chute 45, but they can occur with their neck directed downwards or with their bottom directed downwards. Consequently, at the exit from the chute 45, a selective turning device is provided, so that all the bottles are then necessarily aligned and sent in the same direction.

FIGS. 1 and 7 to 9 show how the selective turning is advantageously performed according to the invention.

At the exit from the chute 45, a casing 46 is provided whose internal thickness appreciably corresponds to the diameter of the bottles so that they do not risk changing plane. At its lower part, this casing contains a belt conveyor designated on the whole by 48, which comprises two belts 49 and 50 carried by pulleys, 51, 52 and 53, the latter being a driver, and consequently, keyed on to a shaft 54, which is itself driven by an electric motor 55.

A rotary brush 56, of rubber, for example, is provided with flexible projecting barbs 57 and driven by the lower strands of the belts 49 and 50, so as to revolve in the direction shown by the arrow $f_3$ in FIG. 8. This brush 56 is approximately aligned with the exit from the chute 45.

The distance apart of the belts 49, 50 is less than the diameter of the bottom of the bottles, but greater than the diameter of their chute.

The casing 46 also contains two endless belts 58 which are placed sloping being carried by sets of pulleys 59, 60. One of the sets of pulleys, 60 for example, in the example shown, is driving and is itself driven by a shaft 61 at whose end a pulley 62 is keyed, connected by a belt 63 to a pulley 64, mounted on the same shaft as the one that carries the rotary brush 56.

FIG. 8 shows that the diameter of the part of the rotary brush 56 which is driven by the belts 49, 50 is smaller than the diameter of the driving pulley 53 and consequently, the rotary brush 56 revolves at high speed and also drives the belts 58 at high speed, in any case, at a greater speed than that of the belts 49, 50. The belts 58 are moved in the direction of the arrow $f_4$ (FIG. 8).

When a bottle falls into the chute 45 with its bottom downwards, as shown in FIG. 8, it encounters the belts 49, 50 advancing in the direction of the arrow $f_5$ and consequently it is subjected to a cross acceleration so that it lays down with its bottom turned forwards on the two said belts 49, 50. Should the bottle rebound, it would come into contact with the belts 58 moved in the direction of the arrow $f_4$ and these belts would have the effect of accelerating the ejection of the bottle in the direction of the arrow $f_5$ while bringing it on to the belts 49, 50 so that the bottle is inserted in an ejection chute 65. If, on the contrary, the bottle falls with its neck downwards, as shown in FIG. 1, then this neck passes between the belts 49, 50 and comes into contact with the flexible barbs 57 of the rotary brush 56. The peripheric speed of the brush 56 being greater than the linear speed of the belts 49, 50, it follows that the bottle, such as the bottle $A_2$, pivots in the direction of the arrow $f_6$ (FIG. 1) to occupy position $A_3$, i.e., with the bottom facing forward. Should the bottle rebound during pivoting, its bottom comes into contact with the belts 58 which further accelerate the reversing movement of the bottle, which is thus laid with certainty in the right direction on the belts 49, 50.

If so desired the ejection chute 65 can be fitted with a recording device 66 enabling the exact number of bottles classified to be ascertained before they are taken to their utilization point, for example, a filling station. The conveying of the bottles from the ejection chute 65 to the utilization point can be effected in many different manners and, for example, as diagrammatized in FIG. 1, through a channel 67 operating in a pneumatic manner.

To avoid any risk of choking the chute 45 or blocking its exit, the motor 55 is provided for driving the belts 49 and 50 at a speed that is always higher than the linear speed of the strip 47 accelerating the bottles when they enter the chute 45, and consequently the motor 55 is advantageously synchronized with the motor 24 on which the speed of the conveyors depends formed by the belts 27, 27a, and 30, 30a which form the driving member for the discs 46, 46a driving the strip 47.

As can be seen from the foregoing description, the bottles A contained in the hopper 1, fill the chamber 4 of the machine when the hopper is put into communication with said chamber and, owing to the particular shape of the bottom 5, the forming of arches is prevented in the chamber 4. Moreover, the forming of arches or obstructions due to the bottles is prevented, both in the chamber 4 as well as facing the partition 4a, i.e., at the intersection between the bottom 5 of the chamber 4 and the deflectors 7, 8 by providing a low frequency shaking mechanism which can be made in many different ways and which is preferably placed at the intersection of the bottom 5 and the deflectors 7 and 8. A shaking mechanism of this kind can, for example, be formed by an offset roller revolving slowly and placed transversally to the machine. We can also form the shaking mechanism by connecting rods 68 (FIGS. 1 and 3), articulated on the bottom 5 made of flexible material, or else, articulated or provided with an articulated shutter, said connecting rods being connected to cranks 69 maintained by springs 70 against offset stops 71, for example, provided at the ends of the shaft 20.

One is assured of the fact of the existence of the means stated above, further completed, if so desired, by a blower issuing inside the chamber 4 and blowing upwards so as to limit gravity action due to a very large mass of bottles, so that the latter are always properly brought to the lower front part of the deflectors 7, 8 through the opening 6.

The sloping arrangement, both crosswise as well as longitudinally of the deflectors which extend over the whole length of the machine, at least at their part contiguous with the bottom 5, means that the bottles are always brought, as shown in FIG. 2, at least into contact with one of the belts 32, 32a or 30, 30a, or even 27, 27a and the bottles are then aligned, as explained in the foregoing, because the belts 32, 32a are moved at different speeds from each other and consequently obliged the bottles to fall into the cradle formed by the belts 27, 27a and 30, 30a.

As also explained in the foregoing, bottles not properly placed in the above-mentioned cradle are extracted by the revolving brushes 38, 39 and are recycled up to the moment when the bottles are suitable to be introduced into the chute 45, then selectively turned before being introduced in a suitable position into the ejection chute 65, and eventually, the channel 67 transferring them to the utilization point.

The invention is not restricted to the example of embodiment shown and descirbed in detail, for various modifications can be applied to it without going outside of its scope. In particular, the machine can be fitted with various safety members belonging to the motor, on one hand, and also acting so that the stopping of the motor 55 cannot be effected except in relation with the stopping of the motor 24, so that one is assured that no more bottles remain in the chute 45.

I claim:

1. Machine for stowing bottles or flasks in a proper position from a batch of bottles or flasks in bulk comprising a receiving chamber for bulk bottles, two rising deflectors having a lower edge thereof contiguous to said chambers, said two deflectors being separated from each other by a set of endless conveyors forming an alignment device for said bottles or flasks, a chute for conveying said bottles to a selective turning unit whereby bottles are brought into the same position on a belt conveyor taking them to an ejection chute where they are led to a utilization point; said alignment device comprising a first conveyor delimited by two endless belts parallel to each other and spaced to an extent less than the diameter of the bottles and flasks, and a second conveyor cooperating with said first conveyor and comprising also two endless belts parallel to each other but separated by a space of a width at least equal to the diameter of the bottles of flasks, said second conveyor having active parts thereof extending at a higher level than the active parts of the first conveyor, means to move said first and second conveyors at the same speed, and a third conveyor also comprising two endless belts parallel to each other and separated by a space of a width less than the length of the bottles or flasks, and means to move said two belts of said third conveyor at different speeds from each other and different to the speeds of the belts of the two first conveyors.

2. Machine according to claim 1, wherein said conveyor belts forming said alignment device are provided with protruding flexible barbs.

3. Machine according to claim 2, in which said flexible protruding barbs with which the belts of the first and third conveyor are provided, project vertically upwards for the active parts of these belts, and the barbs of the belts of the second conveyor project horizontally and are directed towards each other, the distance separating the heads of barbs of the two belts of this second conveyor being slightly less than the diameter of the bottles or flasks.

4. Machine according to claim 1, in which said "selective turning unit" for the bottles comprises, in a casing preventing the bottles from pivoting sideways, two endless belts separated by a distance greater than the diameter of the necks of the bottles, but less than the diameter of their bottoms and a rotary brush with flexible bristles revolving at high speed in the opposite direction to the moving direction of said belts, said bristles of the rotary brush being recessed in relation to the plane delimited by the active part of said belt.

5. Machine according to claim 4, in which the "rotary brush revolving" in the opposite direction to that of the active part of the belts is driven by the inactive strand of said belts by means of a small diameter pulley, so that the peripheric speed of said revolving brush is appreciably higher than the axial speed of the active part of said belts.

6. Machine as set forth in claim 1 comprising variable speed driving members for said conveyors forming the alignment device whereby output of the machine is thus adjustable.

7. Machine according to claim 6, wherein said conveyors forming the alignment device are driven by a single variable speed motor by means of a set of reversing pulleys equalling at all times the speed of the two first conveyors.

8. Machine as set forth in claim 1, in which said receiving chamber is provided with downwardly divergent lateral walls and with a substantially U-shaped bottom connected to said lateral wall at the lower part thereof whereby said receiving chamber affords a progressively increasing passage for bottles falling into said chamber, so as to prevent arches from forming in said receiving chamber by said bottles.

9. Machine as set forth in claim 1, comprising further an accelerating device for bottles conveyed to the top part of the alignment device, whereby extraction of bottles from this alignment device and engagement in said chute leading to said selective turning unit.

10. Machine as set forth in claim 9, in which said accelerating device for extracting the bottles from the alignment device comprises a strip forming part of the entry wall of said chute, said strip being driven by discs of larger diameter than pulleys supporting said second conveyor of the alignment device, discs which are attached to said pulleys whereby the speed of the strip that they drive is always proportional to the speed of the second conveyor while always remaining greater than this latter speed.

11. Machine as set forth in claim 9, comprising further an ejector unit associated with said accelerator device whereby bottles that might not be perfectly lengthened on said first conveyor of said alignment device are ejected towards said alignment device to be recirculated.

12. Machine according to claim 11, wherein said ejector unit is made of two brushes revolving in opposite directions, which are arranged axially in the same direction as the alignment device, the lower generatrices of said two brushes extending just above the level that the highest part of the bottles will occupy when they are taken along on the first conveyor between the belts of the second conveyor.

13. Machine as set forth in claim 1, in which said selective turning unit comprises endless belts arranged in a casing at the top part thereof and are placed so as to converge from the exit of said chute towards the belts of the conveyor of the selective turning device, means provided to drive said convergent belts so that their active part thereof is moved in the same direction as that of the conveyor of the selective turning device, and at a higher speed.

14. Machine according to claim 13, in which the belts of the selective turning unit, are driven by a single electric motor whose speed is synchronized with that of the driving motor of the alignment device, the absolute speed of the belts of the selective turning device being provided greater than that of the accelerating device extracting the bottles from said alignment device.

References Cited

UNITED STATES PATENTS

| 1,588,904 | 6/1926 | Parker | 198—53 |
|---|---|---|---|
| 2,937,738 | 5/1960 | Albertoli | 198—33 |

FOREIGN PATENTS

| 1,065,789 | 5/1954 | France. |
|---|---|---|

RICHARD E. AEGERTER, *Primary Examiner.*